(12) United States Patent
Thrift et al.

(10) Patent No.: US 7,708,318 B2
(45) Date of Patent: May 4, 2010

(54) TUBE TO HOSE COUPLING

(75) Inventors: Charles Thrift, Farmington Hills, MI (US); Rob Koshay, Macomb, MI (US); Carolyn Snyder, South Lyon, MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 25 days.

(21) Appl. No.: 12/100,174

(22) Filed: Apr. 9, 2008

(65) Prior Publication Data

US 2009/0256353 A1 Oct. 15, 2009

(51) Int. Cl.
*F16L 33/00* (2006.01)
(52) U.S. Cl. ...................................... 285/256
(58) Field of Classification Search ................ 285/256
See application file for complete search history.

(56) References Cited

U.S. PATENT DOCUMENTS

| | | | | |
|---|---|---|---|---|
| 3,951,438 A * | 4/1976 | Scales | ........................ | 285/55 |
| 5,040,830 A * | 8/1991 | Atkinson | ..................... | 285/256 |
| 5,044,671 A | 9/1991 | Chisnell et al. | | |
| 5,348,779 A * | 9/1994 | Igarashi | ..................... | 428/36.9 |
| 5,370,425 A * | 12/1994 | Dougherty et al. | ............ | 285/39 |
| 5,417,461 A | 5/1995 | Dougherty et al. | | |
| 5,961,157 A * | 10/1999 | Baron et al. | ................. | 285/256 |
| 6,311,733 B1 * | 11/2001 | Azzolini et al. | ............. | 138/109 |
| 6,540,262 B1 * | 4/2003 | Humphreys | ................. | 285/256 |
| 6,688,653 B1 | 2/2004 | Thrift et al. | | |
| 6,832,785 B1 | 12/2004 | Zitkovic, Jr. | | |
| 7,000,644 B2 * | 2/2006 | Ichimura et al. | ............ | 138/109 |
| 7,108,292 B2 * | 9/2006 | Lipscomb et al. | ........... | 285/272 |
| 7,500,696 B2 * | 3/2009 | Van Pelt et al. | ............. | 285/256 |
| 2008/0136176 A1 * | 6/2008 | Katayama et al. | ........... | 285/256 |

* cited by examiner

*Primary Examiner*—David E Bochna
(74) *Attorney, Agent, or Firm*—Leydig, Voit & Mayer, Ltd.

(57) ABSTRACT

A tube-to-hose coupling includes an elongated hollow insert connected between an end of the tube and defining an insert receiving portion and the end of the hose defining an insert receiving portion. The insert is disposed in the insert receiving portion of the tube end and the insert receiving portion of the hose end in fluid tight sealing relation. Thermoplastic polymeric material is bonded between the insert and the hose during insertion of the insert into the bore of the hose. The tube is connected to the insert and the hose by plastic deformation. In one embodiment the polymeric material is a layer defining the internal bore of the hose. In another, the polymeric material defines an outer layer on the insert.

17 Claims, 2 Drawing Sheets

TUBE TO HOSE COUPLING

TECHNICAL FIELD

This invention relates to crimp-type tube-to-hose couplings and methods of making this type of coupling, with particular adaptation for vehicular air conditioning systems and similar sealed fluid conducting systems.

BACKGROUND ART

In every vehicular air conditioning system there is a plurality of sections of flexible hose. These hose sections connect in a single system, with various system components including a compressor, condenser, evaporator and other system components.

A coupling is required at each hose end to allow the hose to be secured to the various components between which it extends. The coupling will usually include the end portion of a rigid tube which is secured to the flexible hose. The tube will include a flare fitting or other arrangement for connection to a system component.

The usual coupling for securing the flexible hose to the rigid tube is to utilize a connector portion with two concentric cylindrical walls spaced from one another by approximately the thickness of the hose. One of these concentric walls includes a radially extending flange securing it to the other. The inner concentric wall includes a throughbore to allow for fluid passage between the rigid tube and hose.

The hose is inserted between the inner concentric cylinder and the outer concentric cylinder. The outer cylindrical wall is crimped (plastically deformed) onto the hose and the inner concentric cylinder to form a fluid tight joint.

A typical coupling of this type is shown in U.S. Pat. No. 5,044,671, assigned to TI Group Automotive Systems, LLC. There, the inner cylindrical wall is formed by the outer surface of the rigid tube. The outer concentric wall is formed by a sleeve that includes a radial flange extending radially inward and joined to the inner concentric tube. The inner concentric wall, or tube, is provided with annular locking ribs and the radial flange is the swaged or crimped onto the locking ribs of the tube.

Alternatively, the tube may be upset, or otherwise provided with a radial shoulder, immediately adjacent and contiguous with both sides of the radial flange of the sleeve to provide an axial stop in both directions. In each case, the axial position of the two coupling components, (i.e., the sleeve and the tube) is fixed to define an annular space to receive the hose. This type of coupling configuration requires a number of metal forming operations on the end of the tube and a separately formed sleeve.

A more recent development in tube to house couplings is described in U.S. Pat. No. 5,417,461 also assigned to TI Group Automotive Systems, LLC. Here, the outer cylindrical crimp wall is integral with the rigid tube. The inner coupling wall is defined by a separate insert fitted with a seal. The tube is preformed to include a circumferential seat to mate with the installed seal on the insert.

Another similar coupling is described in U.S. Pat. No. 5,961,157, assigned to Manuli Auto France. This patent discloses a coupling in which the outer cylindrical crimp wall is also formed by the rigid tube. The inner cylindrical wall is defined by an insert assembled into the tube end to define the hose receiving annulus. The insert is also fitted with a seal. In this design, a forward tubular portion of the insert, fitted with a seal, is forced into the unexpanded inner diameter end portion of the rigid tube. Necessarily the diameter of the throughbore of the insert is smaller than the bore of the tube.

The insert in each of the foregoing designs typically is made from a rigid material (such as aluminum or steel) having sufficient strength to resist the crimping forces necessary to create a seal between the insert and the flexible hose. These materials and associated manufacturing methods are costly. One solution would be to reduce the crimping force and fit the insert with a seal member such as the O-ring employed between the rigid tube and the insert. Such a seal member would create a seal between the outer surface of the insert and the inner diameter of the flexible hose. The required groove to retain the seal would require an increase in wall thickness of the insert and therefore a reduced throughbore diameter. Such a reduced throughbore has negative effects on the performance of the coupling with regard to fluid flow since it defines a restrictive orifice in the fluid system.

The present invention provides a coupling device and method of making a connection between a rigid tube and flexible hose which avoids undue restriction of the flow passage and simplifies manufacturing processes required to create the coupling.

SUMMARY OF THE INVENTION

The present invention provides a simple, economical and leak-tight construction of crimp-type tube-to-hose coupling. The coupling of the invention includes an insert sealed at one end portion to the tube and sealed at its opposite end portion to the flexible hose leg a polymeric layer bonded between the insert and the flexible hose.

DETAILED DESCRIPTION OF ILLUSTRATED EMBODIMENTS

Figure 1:
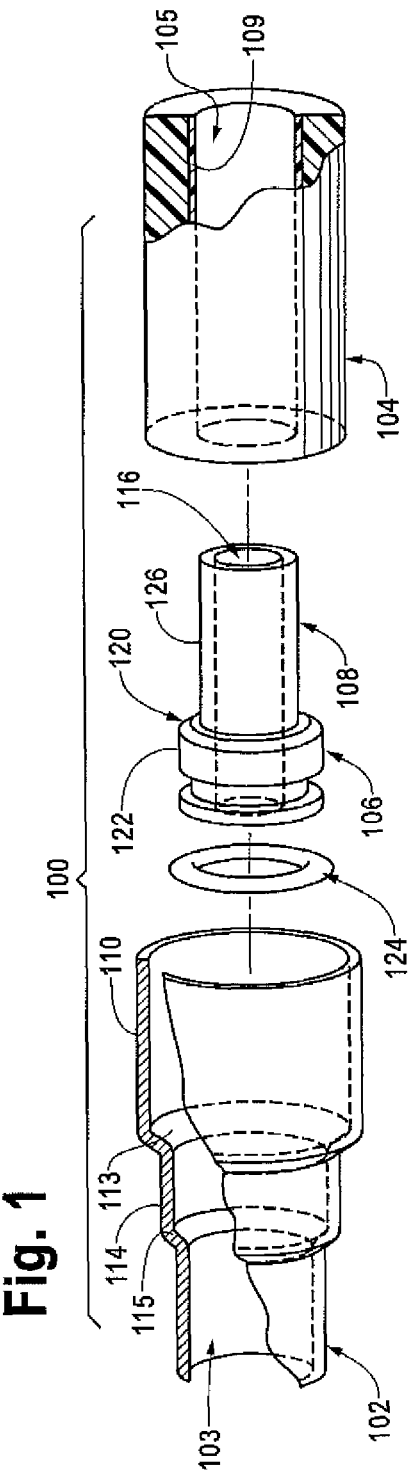
FIG. 1 is an exploded perspective view prior to assembly, showing the components of a tube-to-hose coupling embodying the principles of the present invention.
Figure 2:
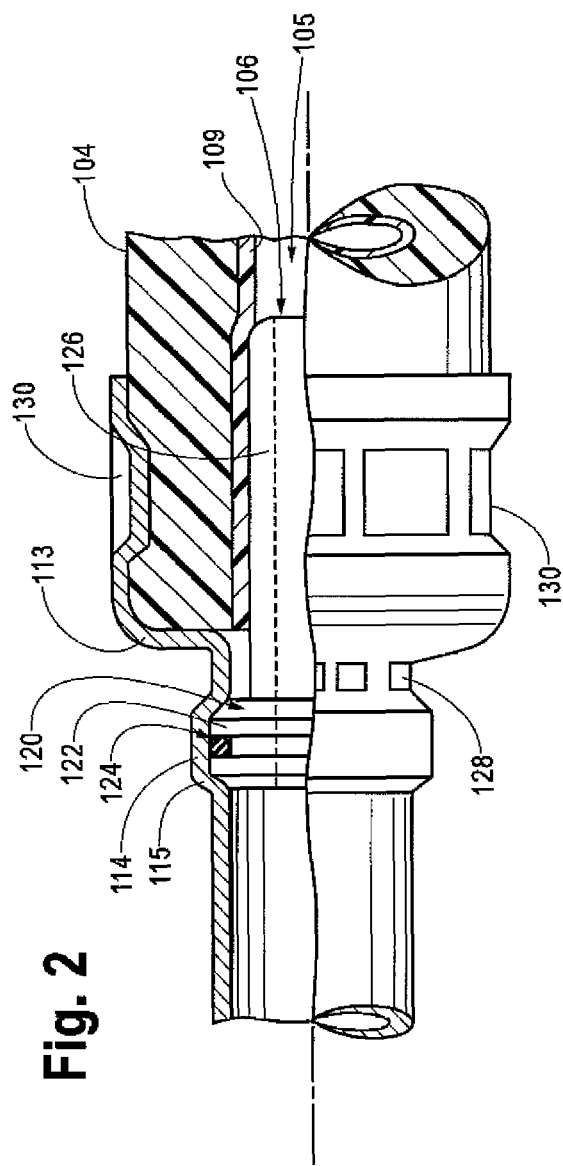
FIG. 2 is a side view, partially in section, of the assembled coupling of FIG. 1.

Referring to FIGS. 1 and 2, the disclosed coupling, with components manufactured and assembled as described below, forms a leak-tight joint having many fluid conveying applications. It is particularly suited for use in vehicular air conditioning systems.

Referring to FIGS. 1 and 2, coupling 100 includes rigid hollow tube 102 connected to hollow flexible hose 104 by elongate hollow insert 106. An end (not shown) of the tube 102 is configured to connect to a system component. It may include, for example, a flare shape and support a rotatable nut for attachment to a threaded seat element formed on the system component. The opposite end (not shown) of hose 104 may connect to another tube or other form of coupling.

Tube 102 is made from steel or aluminum alloy. A suitable alloy is 3000 series aluminum alloy. It defines internal bore 103.

Referring to FIG. 1, an end portion of the tube is formed to define a first radially enlarged sleeve portion 110 and a second or intermediate radially enlarged sleeve portion 114. First, radially enlarged sleeve portion 110 is sized to receive the outer surface of flexible hose 104. Intermediate radially enlarged sleeve portion 114 is sized to receive a portion of the insert 106 as described below.

Radially directed annular wall 113 extends between first radially enlarged sleeve portion 110 and intermediate radially enlarged sleeve portion 114. It defines a shoulder that limits axial insertion of hose 104.

Radially directed annular wall 115 extends between intermediate radially enlarged sleeve portion 114 and the internal bore 103 of tube 102. It defines a shoulder that limits axial insertion of insert 106 into tube 102.

The insert 106 has an axial length that is somewhat longer than the axial distance between the shoulder defined by radially annular wall 115 and the free end of the tube 102. It defines throughbore 116 which provides a fluid path between the internal bore of tube 103 and the internal bore 105 of the hose 104. The cross sectional area of bore 116 is about seventy percent (70%) of the cross sectional area of bore 105 of hose 104.

The insert 106 is made from reinforced thermoplastic. A suitable material for the insert is polyamide 6 (Nylon 6). A suitable reinforcing material for the insert is glass fiber with a filling rate of about ten percent (10%) by weight. It could also be made of metal such as aluminum and coated with a layer of polymeric material such as polyamide 6 as discussed below.

An end portion of insert 106 includes enlarged cylindrical collar 120. Collar 120 has a diameter to be snugly received in intermediate radially enlarged portion 114 of tube 102 in piloting relation. Outer axial surface 122 is provided with a radial groove in which is positioned sealing member in the form of an O-ring seal 124 having an outer diameter greater than that of axial surface 122. O-ring seal 124 seals against the inner surface of intermediate radially enlarged sleeve portion 114 when collar 120 is inserted into intermediate radially enlarged sleeve portion 114. The end of collar 120 abuts shoulder 115 to axially position the insert 106.

The other end portion of insert 106 defines cylindrical barrel 108, and includes an outer cylindrical surface 126 having a diameter somewhat larger than the internal bore 105 of hose 104. It is sized to be received in bore 105 of hose 104 with minimal axial insertion force.

Hose 104 is flexible, made of multiple extruded layers and includes internal bore 105. The end portion of hose 104 defines an insert receiving portion.

The hose 104 has an inner layer 109 of thermoplastic or thermoplastic blend material suitable for vehicular air conditioning systems bonded to the adjacent radially outward layer of the hose. It has a thickness of approximately 0.2 mm. The inner layer material is chosen for its resistance to compressor lubricating oils such as polyalkylene glycol (PAG) or polyol ester (POE), resistance to diffusion of refrigerants such as HFC134a or HFC152a, resistance to the refrigerants in terms of chemical extraction, and capable of performing in a temperature range of −30 to +150° C.

A suitable material for inner layer 109 is polyamide 6-6 or a blend of polyamide 6-6 and IIR (Butal) elastomer. This material also well suited for use in the present invention, since the thermoplastic material can be fused to form a strong and leak-tight joint using frictional surface melting of the material.

The coupling 100 of FIGS. 1 and 2 is assembled by axially inserting barrel 108 of insert 106 into the bore 105 of hose 104. Since the outer cylindrical surface 126 of cylindrical barrel 108 has a diameter larger than the bore 105 of hose 104, these surfaces are in contact with a small radially inward force imparted to the barrel 108 by the hose 104.

The insert is rotated about its axis or vibrated axially at a rate to generate heat during insertion. The friction from the spinning or vibratory contact causes surface melting of the inner layer 109 and the outer cylindrical surface 126 of the barrel 108 of insert 106 which results in a fusing of the inner layer 109 of hose 104 to the outer cylindrical surface 126 of barrel 108.

It is contemplated that other methods accomplishing a bond of the polymeric layer to the adjacent surface. These include induction heating, use of a solvent or of an adhesive.

Once fully inserted, insert 106 extends from free end of hose 104 about the same axial length as the axial spacing between radially annular wall 113 and radially annular wall 115. The sub-assembly of hose 104 and insert 106 is then connected to tube 102. Collar 120 with O-ring seal 124 is inserted into the end of the tube 102 until the collar abuts the shoulder defined by radial annular wall 115. This positions the end of hose 104 within radially enlarged sleeve portion 110 with free end of the hose abutting radially annular wall 113.

The intermediate radially enlarged portion 114 of tube 102 is crimped radially inward adjacent the collar 120 to collapse the portion 114 onto the outer axial surface 122 collar 120. The crimp 128 captures collar 120 to secure the insert 106 to the tube. Seal member 124 is compressed against the inner surface of intermediate radially enlarged portion 114 and collar 120 to create a fluid tight seal.

The radially enlarged sleeve portion 110 which overlies the end portion of hose 104 is crimped or plastically deformed radially inwardly onto the hose forming crimp 130. The annular wall of the hose is compressed between the barrel 108 of insert 104 and the radially enlarged sleeve portion 110 to mechanically secure the hose to the insert. The crimping operations may be done in sequence or simultaneously.

The insert 106 is sealed relative to rigid tube 102 by O-ring seal 124. The insert 106 is sealed to the inner surface of hose 104 by the bond created by the surface melting of inner polymeric layer 109. The layer 109 is bonded to the outer cylindrical surface 126 of insert 106 on assembly.

The fluid seal arrangement of the embodiment of FIGS. 1 and 2 is suitable for incorporation in the various tube-to-hose couplings disclosed in the previously identified United States patents. In such arrangements, the flexible hose would include an inner layer such as the polyamide layer 109.

Figure 3:
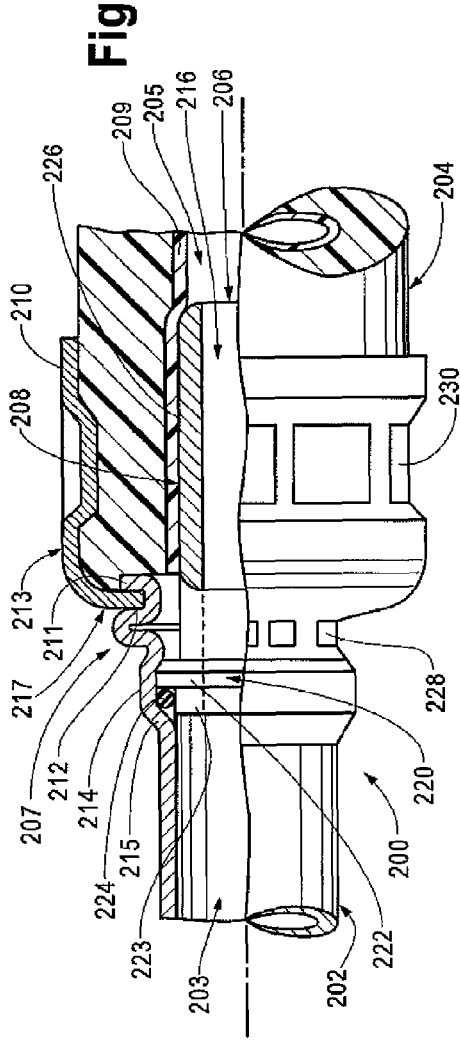
FIG. 3 is a side view, partially in section, of a modified form of coupling embodying principles of the present invention.

Another coupling exemplary of the principles of the present invention is shown in FIG. 3. This embodiment is similar to the embodiment of FIGS. 1 and 2 with the exception that the end of the rigid tube is provided with a separate crimp sleeve component secured to the end portion of the rigid tube. Consistent with the principles of the present invention, a polymeric thermoplastic layer of the flexible hose is bonded between the outer cylindrical surface of the hose.

Referring to FIG. 3, coupling 200 includes rigid hollow tube 202 connected to hollow flexible hose 204 by elongate hollow insert 206. An end (not shown) of the tube 202 is configured to connect to a system component. It may include, for example, a flare shape and support a rotatable nut for attachment to a threaded seat element formed on the system component. The opposite end (not shown) of hose 204 may connect to another tube or other form of coupling. Tube 202 is made from steel or aluminum alloy. A suitable alloy is 3000 series aluminum alloy. It defines internal bore 203.

Referring to FIG. 3, an end portion of the tube is formed to define a radially enlarged portion 214 sized to receive a portion of the insert 206 as described below. Sleeve portion 214 is formed to define spaced radial outward flanges 211 and 212. These flanges define an annular channel.

A separate generally cylindrical crimp sleeve 213 extends axially from the end portion 207. It includes a cylindrical sleeve portion 210 and an annular radial wall 217. Radial wall 217 is champed within the channel formed between radial flanges 211 and 212 to secure the crimp sleeve 213 to tube end. The sleeve portion 210 is sized to receive the outer surface of the flexible hose 204. Wall 217 and radial flange 211 limit axial movement of the hose relative to tube 202.

Conical wall 215 extends between radially enlarged sleeve portion 214 and the internal bore 203 of tube 202. It defines a shoulder that limits axial insertion of insert 206 into tube 202.

The insert 206 has an axial length that is somewhat longer than the axial distance between the shoulder defined by conical wall 215 and the free end of the sleeve 210. Insert 206 defines throughbore 216 which provides a fluid path between the internal bore 203 of tube 202 and the internal bore 205 of the hose 204. The cross sectional area of bore 216 is about seventy percent (70%) of the cross sectional area of bore 205 of hose 204.

The insert 206 is made from reinforced thermoplastic. A suitable material for the insert is polyamide 6 (Nylon 6). A suitable reinforcing material for the insert is glass fiber with a filling rate of about ten percent (10%) by weight. It could also be made of metal such as aluminum coated with an outer layer of polymeric material such as polyamide 6 as discussed below.

One end portion of insert 206 includes enlarged cylindrical collar 220. Collar 220 has a diameter to be snugly received in radially enlarged portion 214 of tube 202 in piloting relation. Outer axial surface 222 is provided with a relief 223 on which is positioned a sealing member in the form of an O-ring seal 224 having an outer diameter greater than that of axial surface 222. O-ring seal 224 seals against the inner surface of radially enlarged sleeve portion 214 when collar 220 is inserted into radially enlarged sleeve portion 214. The end of collar 220 abuts conical wall 215 to axially position the insert.

The other end portion of insert 206 defines barrel 208, with an outer cylindrical surface 226 having a diameter somewhat larger than the internal bore 205 of hose 204. It is sized to be received in bore 205 of hose 204 with minimal axial insertion force.

Hose 204 is flexible, made of multiple extruded layers and includes internal bore 205. The end portion of hose 204 defines an insert receiving portion.

The hose 204 has an inner layer 209 of thermoplastic or thermoplastic blend material suitable for vehicular air conditioning systems bonded to the adjacent radially outward layer of the hose. It has a thickness of approximately 0.2 mm. The inner layer material is chosen for its resistance to compressor lubricating oils such as polyalkylene glycol (PAG) or polyol ester (POE), resistance to diffusion of refrigerants such as HFC134a or HFC152a, resistance to the refrigerants in terms of chemical extraction, and capable of performing in a temperature range of −30 to +150° C.

A suitable material for inner layer 209 is polyamide 6-6 or a blend of polyamide 6-6 and IIR (Butal) elastomer. This material also well suited for use in the present invention, since the thermoplastic material can be fused to form a strong and leak-tight joint using frictional surface melting of the hose material.

The coupling 200 of FIG. 3 is assembled by axially inserting cylindrical barrel 208 of insert 206 into the bore 205 of hose 204. Since the outer cylindrical surface 226 of barrel 208 has a diameter larger than the bore 205 of hose 204, these surfaces are in contact.

The insert is rotated about its axis or vibrated axially at a rate to generate heat during insertion. The friction from the spinning or vibratory contact causes surface melting of the inner layer 209 and the outer cylindrical surface 226 of the barrel 208 of insert 206 which results in a fusing of the inner layer 209 of hose 204 to the outer cylindrical surface 226 of barrel 208.

It is contemplated that other methods accomplishing a bond of the polymeric layer to the adjacent surface. These include induction heating, use of a solvent or of an adhesive.

As inserted, the insert 206 extends from free end of hose 204 about the same axial length as the distance from conical wall 215 to the radial flange 211 formed on the free end of tube 202. The sub-assembly of hose 204 and insert 206 is then connected to tube 202. Collar 220 with O-ring seal 224 is inserted into the end of the tube 202 until the relieved portion of collar 220 with O-ring 224 abuts the shoulder defined by conical wall 215. This positions the end of hose 204 within radially enlarged sleeve portion 210 with the free end of the hose abutting radial wall 217 of crimp sleeve 213 and radial flange 211 of tube 202.

The radial flange 212 of tube 202 is plastically deformed or crimped radially inward adjacent the collar 220 to collapse the portion 214 onto the collar 220. The crimp 228 captures collar 220 to secure the insert 206 to the tube. Seal 224 is compressed against the conical wall 215 and relief 223 to create a fluid tight seal.

The separate crimp sleeve 213 which overlies the end of hose 204 is crimped or plastically deformed radially inwardly onto the hose forming crimp 230. The annular wall of the hose is compressed between the outer cylindrical surface 226 of insert 204 and the crimp sleeve 213 to mechanically secure the hose to the insert. The crimping operation may be done in sequence or simultaneously.

The insert 206 is sealed relative to rigid tube 202 by O-ring seal 224. The insert 206 is sealed to the inner surface of hose 204 by the bond created by the surface melting of inner polymeric layer 209. This bond exists between the inner layer 209 of hose 204 and outer cylindrical surface 226 of barrel 208.

Figure 4:
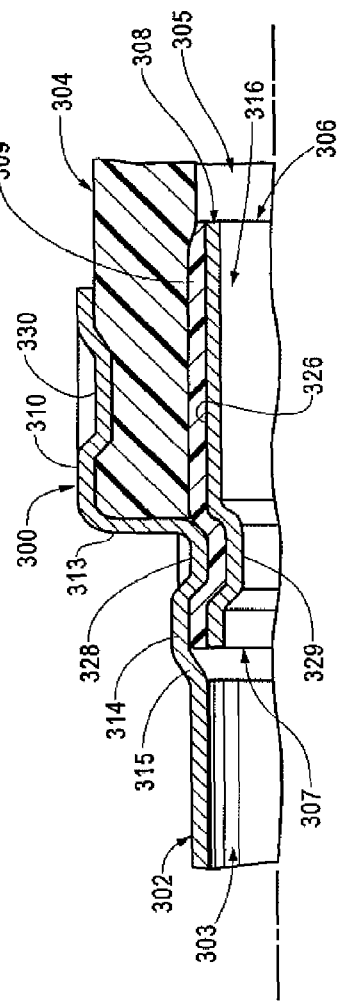
FIG. 4 is a partial cross-sectional view of a modified form of tube-to-hose coupling embodying the principles of the present invention.
Figure 5:
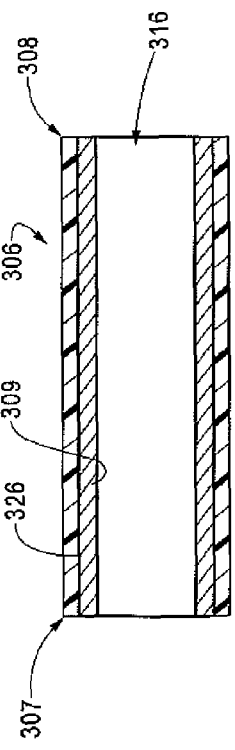
FIG. 5 is a side sectional view of a component of the tube-to-hose coupling of FIG. 4.

A further alternative form of tube-to-hose coupling 300 embodying principles of the present invention is disclosed in FIGS. 4 and 5. Here, a tube 302 having bore 303 is secured to flexible hose 304 having internal bore 305 with an elongate hollow insert 306 consistent with the principles of the present invention. The outer surface of the insert 306 includes a bonded polymeric layer that seals to the tube 302 and to flexible hose 304.

Referring to FIGS. 4 and 5, coupling 300 includes rigid hollow tube 302 connected to hollow flexible hose 304 by elongate hollow insert 306. An end (not shown) of the tube 302 is configured to connect to a system component also as described with respect to earlier embodiments. Similarly, the opposite end (not shown) of base 304 may connect to another tube or other form of coupling. Tube 302 is made from steel or aluminum alloy as previously described with respect to earlier embodiments. It defines internal bore 303.

Referring to FIG. 4, free end portion of the tube is formed to define a first radially enlarged sleeve portion 310 and a second or intermediate radially enlarged sleeve portion 314. Sleeve portion 310 is sized to receive the outer surface of flexible hose 304. Intermediate radially enlarged sleeve portion 314 is sized to receive a portion of the insert 306 as described below.

Radially directed annular wall 313 extends between first radially enlarged sleeve portion 310 and intermediate radially enlarged sleeve portion 314. It defines a shoulder that limits axial insertion of hose 304.

Conical wall 315 extends between intermediate radially enlarged sleeve portion 314 and the internal bore 303 of tube 302. It defines a shoulder that limits axial insertion of insert 306 into tube 302.

The insert 306 is cylindrical and has an axial length that is somewhat longer than the axial distance between the shoulder defined by wall 315 and the free end of the tube 302. It defines throughbore 316 which provides a fluid path between the internal bore of tube 303 and the internal bore 305 of the hose 304. The cross sectional area of bore 316 is about seventy percent (70%) of the cross sectional area of bore 305 of hose 304 as in previous embodiments.

The insert 306 is made from metal, although the insert 306 could be made from the same material as the insert 106 of the embodiment of FIGS. 1 and 2 or the insert 206 of the embodiment of FIGS. 3 and 4. A suitable material for the insert is steel or aluminum.

Insert 306 is a generally elongate cylindrical tube defining end portion 307 for insertion into tube 302 and end portion or barrel 308 for insertion into hose 304. It defines throughbore 316 described above. It includes an outer cylindrical surface 326 over which is a layer 309 of polymeric material described below. This layer may be overmolded onto outer cylindrical surface 326 or otherwise bonded to outer cylindrical surface 326. Alternatively, layer 309 may comprise a loose polymeric sleeve having an inner bore sized to receive the outer cylindrical surface 326 of insert 306. Bonding of the polymeric sleeve to the insert and hose occurs on insertion into the hose and causing frictional heating.

The outer diameter over the outer polymeric layer 309 that is somewhat larger than the internal bore 305 of hose 304 and the intermediate radially enlarged sleeve portion 314. The insert is received in bore 305 of hose 304 and intermediate radially enlarged sleeve portion 314 with minimal axial insertion force.

Hose 304 is flexible and includes internal bore 305 and includes an end portion that defines an insert receiving portion. It may be a mono-layer hose of extruded polyamide.

In accordance with the present invention, outer layer 309 of insert 306 is a thermoplastic or thermoplastic blend material suitable for vehicular air conditioning systems. It has a thickness of approximately 0.2 mm. The layer material is chosen for its resistance to compressor lubricating oils such as polyalkylene glycol (PAG) or polyol ester (POE), resistance to diffusion of refrigerants such as HFC134a or HFC152a, resistance to the refrigerants in terms of chemical extraction, and capable of performing in a temperature range of −30 to +150° C.

A suitable material for layer 309 is polyamide 6-6 or a blend of polyamide 6-6 and IIR (Butal) elastomer. This material also well suited for use in the present invention, since the thermoplastic material can be fused together to form a strong and leak-tight joint using friction.

The coupling 300 of FIGS. 1 and 5 is assembled by axially inserting end portion or barrel 308 of insert 306 into the bore 305 of hose 304. Since the outer cylindrical surface of barrel 308 over outer polymeric layer 309 has a diameter larger than the bore 305 of hose 304, these surfaces are in contact with a small radially inward force imparted to the barrel 308 by hose 304.

The insert is rotated about its axis or vibrated axially at a rate to generate heat during insertion. The friction from the spinning or vibratory contact causes surface melting of the outer layer 309 and inner bore of hose 304 which results in a fusing of the layer to the inner bore 305 of hose 304. Alternatively, the bonding of the outer layer 309 to the inner bore 305 hose 304 may be accomplished by high frequency or ultra-sonic heating of the thermoplastic material of the sleeve. If, as contemplated in an embodiment described above, the sleeve 309 is not initially bonded to insert 306 the high frequency or ultra-sonic heating bonds the thermoplastic layer 309 to both the outer cylindrical surface 326 of insert 306 and the inner bore 305 of hose 304. It is also contemplated that a solvent could be used, or an adhesive layer could be employed between the polymeric layer and the adjacent surface.

As inserted, insert 306 extends from free end of hose 304 about the same axial length as the axial spacing between radially annular wall 313 and conical wall 315. The subassembly of the hose 304 and insert 306 is then connected to tube 302. The exposed end portion 307 of insert 306 is inserted into the end of the tube 302 until the free end abuts the shoulder defined by conical wall 315. This positions the end of hose 304 within radially enlarged sleeve portion 310 with free end of the hose abutting radially annular wall 313.

The intermediate radially enlarged portion 314 of tube 302 is plastically deformed or crimped radially inward to collapse the portion 314 onto the cylindrical surface of the insert 306. The crimp at 328 secures the insert 306 to the tube. This depression of the sleeve portion 314 compresses the polymeric layer 309 between the inner surface of the sleeve and the outer cylindrical surface 326 of the end portion 307 of insert 306. This operation also causes a small radial inward plastic deformation or indentation 329 of sleeve 306.

The outer polymeric layer 309 of insert 306 is thereby sealed against the inner cylindrical surface of intermediate radially enlarged portion 311 of tube 302 to create a fluid tight seal.

The radially enlarged sleeve portion 310 which overlies the end of hose 304 is crimped or plastically deformed radially inwardly onto the hose forming crimps or depressions 310. The annular wall of the hose is compressed between the outer cylindrical surface 326 of insert 304 and the radially enlarged sleeve portion 310 to mechanically secure the hose to the insert. The crimping operation may be done in sequence or simultaneously.

The insert 306 is sealed relative to rigid tube 302 by the polymeric layer 309. The insert 306 is sealed to the inner surface of hose 304 by the bond created by the surface melting of polymeric layer 309 to the internal bore of hose 304.

In this design variation, the thermoplastic layer serves as the sealing means to provide a fluid tight seal to the rigid tube 302. The radially inward plastic deformation of intermediate radially enlarged sleeve 314 at crimp 328 also causes a radially inward plastic deformation 329 of the cylindrical insert 306. The resulting depression of the insert 306 forms a shoulder which serves to secure the insert 306 to the tube end portion 307 within intermediate radially enlarged sleeve 314.

Various features of the present invention have been shown and described with reference to the illustrated embodiments. It should be understood that modifications may be made without departing from the scope of the invention.

What is claimed:

1. A tube-to-hose coupling comprising:
A rigid tube having an internal bore including an end portion defining an insert receiving portion;
a flexible hose having an internal bore defining an insert receiving portion;

an elongate hollow insert defining a through bore, said insert including an end portion secured within said insert receiving portion of said internal bore of said tube in fluid tight relation, and an end portion of said insert secured within said insert receiving portion of said internal bore of said hose in fluid tight relation;

one of said internal bore of said hose and said end portion of said insert secured within said insert receiving portion of said bore of said hose including a thermoplastic layer bonded thereto;

said thermoplastic layer further being bonded to the other one of said internal bore of said hose and said end portion of said insert secured within said insert receiving portion of said hose;

said insert defines an outer cylindrical surface disposed in said internal bore of said tube and an outer cylindrical surface disposed in said internal bore of said flexible hose;

said tube includes a hose receiving portion, said insert receiving portion of said hose is disposed in said hose receiving portion of said tube;

said hose receiving portion is a separate sleeve connected to said tube and said hose receiving portion of said tube is deformed inwardly.

2. A tube-to-hose coupling comprising:

A rigid tube having an internal bore including an end portion defining an insert receiving portion;

a flexible hose having an internal bore defining an insert receiving portion;

an elongate hollow insert defining a through bore, said insert including an end portion secured within said insert receiving portion of said internal bore of said tube in fluid tight relation, and an end portion of said insert secured within said insert receiving portion of said internal bore of said hose in fluid tight relation;

one of said internal bore of said hose and said end portion of said insert secured within said insert receiving portion of said bore of said hose including a thermoplastic layer bonded thereto;

said thermoplastic layer further being bonded to the other one of said internal bore of said hose and said end portion of said insert secured within said insert receiving portion of said hose;

said insert defines an outer cylindrical surface disposed in said internal bore of said tube and an outer cylindrical surface disposed in said internal bore of said flexible hose;

said tube includes a hose receiving portion, said insert receiving portion of said hose is disposed in said hose receiving portion of said tube;

said insert receiving portion of said tube is defined by a radially enlarged portion of said tube and a portion of said insert is disposed in said radially enlarged portion of said tube;

a sealing member is disposed between said insert receiving portion of said tube, and said portion of said insert disposed in said insert receiving portion and said insert receiving portion of said tube is deformed radially inwardly toward said insert.

3. A tube-to-hose coupling as claimed in claim 2, wherein said tube includes an expanded end portion defining said hose receiving portion and said hose receiving portion of said tube is deformed radially inwardly.

4. A tube-to-hose coupling as claimed in claim 2, wherein said insert includes an enlarged cylindrical collar disposed in said insert receiving portion of said tube, and said sealing member is disposed between said insert receiving portion of said tube and said cylindrical collar.

5. A tube-to-hose coupling as claimed in claim 4, wherein said seal member is an O-ring.

6. A tube-to-hose coupling as claimed in any one of claims 1 to 4, wherein said thermoplastic layer is selected from the group comprising polyamide 6, polyamide 6-6, or a polymeric blend containing polyamide 6 or polyamide 6-6.

7. A tube-to-hose coupling as claimed in claim 6, wherein said thermoplastic layer includes is a polyamide 6-6 blend and said insert comprises a glass filled polyamide 6.

8. A tube-to-hose coupling as claimed in claim 2 wherein said thermoplastic layer is on said outer surface of said insert and further defines said sealing member disposed between said insert receiving portion of said tube and said portion of said insert disposed in said insert receiving portion of said tube.

9. A tube-to-hose coupling as claimed in claim 8, wherein said insert is made of metal and includes said layer of polymeric material overmolded therein.

10. A tube-to-hose coupling as claimed in claim 8 wherein said polymeric layer comprises a sleeve having an internal bore, with said outer cylindrical surface of said insert disposed in said internal bore of said polymeric sleeve.

11. A tube-to-hose coupling as claimed in claim 8 wherein said insert receiving portion of said tube and said portion of said insert disposed in said insert receiving portion of said tube are deformed radially inwardly.

12. A tube-to-hose coupling as claimed in claim 11 wherein said polymeric layer is polyamide 6.

13. A tube-to-hose coupling as claimed in claim 8 wherein said flexible hose includes an inner layer of thermoplastic polymeric material defining said internal bore of said hose.

14. A tube-to-hose coupling as claimed in claim 13 wherein said inner polymeric layer of said hose is selected from the group comprising polyamide 6, polyamide 6-6, or a polymeric blend containing polyamide 6 or polyamide 6-6.

15. A method of forming a coupling between a rigid tube and a flexible hose the steps comprising:

providing a rigid tube having an internal bore having a radially enlarged portion defining an insert receiving portion and a radially enlarged portion defining a hose receiving portion, providing a flexible hose having an internal bore defining an insert receiving portion, providing an elongated hollow insert having an internal bore and having an end portion defining an outer cylindrical surface to be received in said receiving portion of said tube and an end portion defining an outer cylindrical surface to be received in said insert receiving portion of said hose;

providing one of said outer cylindrical surface of said insert and said internal bore of said hose with a layer of thermoplastic polymeric material bonded thereto, inserting said end portion of said insert into said insert receiving portion of said hose, causing at least a portion of said thermoplastic layer bonded to one of said outer cylindrical surface of said insert and said internal bore of said hose to bond to the other of said internal bore of said hose and said outer cylindrical surface of said insert, providing a sealing member disposed between said insert receiving portion of said tube, and said portion of said insert disposed in said insert receiving portion and inserting said outer cylindrical surface of said insert and said sealing member into said insert receiving portion of said tube and said insert receiving portion of said hose in said hose receiving portion of said tube, deforming said insert receiving portion and said hose receiving portion of said tube radially inwardly.

16. A method of forming a tube-to-hose coupling as claimed in claim 15 the steps further comprising overmolding said thermoplastic layer to said outer cylindrical surface of said insert.

17. A method of forming a tube-to-hose coupling as claimed in claim 15, the steps further comprising:

providing a multi-layer hose having an internal layer of said thermoplastic polymeric layer.

* * * * *